United States Patent
Nomura et al.

(10) Patent No.: US 7,240,708 B2
(45) Date of Patent: Jul. 10, 2007

(54) PNEUMATIC TIRE

(75) Inventors: Takeshi Nomura, Kanagawa (JP); Takeshi Koyama, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 375 days.

(21) Appl. No.: 10/749,409

(22) Filed: Jan. 2, 2004

(65) Prior Publication Data

US 2004/0140033 A1 Jul. 22, 2004

(30) Foreign Application Priority Data

Jan. 7, 2003 (JP) .............................. 2003-001180

(51) Int. Cl.
*B60C 5/14* (2006.01)

(52) U.S. Cl. .............................. 152/510; 152/DIG. 16

(58) Field of Classification Search ................ 152/510, 152/DIG. 16
See application file for complete search history.

(56) References Cited

U.S. PATENT DOCUMENTS

| | | | | | |
|---|---|---|---|---|---|
| 3,299,934 | A | * | 1/1967 | Pace | 152/501 |
| 4,928,741 | A | * | 5/1990 | Rye et al. | 152/504 |
| 5,036,113 | A | * | 7/1991 | Boon et al. | 522/96 |
| 5,040,583 | A | * | 8/1991 | Lin et al. | 152/510 |
| 6,136,123 | A | * | 10/2000 | Kaido et al. | 156/123 |
| 6,569,533 | B1 | * | 5/2003 | Uchida et al. | 428/423.1 |
| 2004/0089388 | A1 | * | 5/2004 | Fujino et al. | 152/510 |

FOREIGN PATENT DOCUMENTS

| | | |
|---|---|---|
| EP | 0 706 878 | 4/1996 |
| EP | 1 081 170 | 3/2001 |
| EP | 1 145 872 | 10/2001 |
| EP | 1 369 443 | 12/2003 |

OTHER PUBLICATIONS

Communication from EPO, with European Search Report, mailed Apr. 13, 2004, for No. EP. 03 02 9991.

* cited by examiner

*Primary Examiner*—Geoffrey L. Knable
(74) *Attorney, Agent, or Firm*—Antonelli, Terry, Stout & Kraus, LLP.

(57) ABSTRACT

A pneumatic tire comprising a skin layer which is formed by curing a polyurethane resin composition comprising a compound having active hydrogen atoms and an organic polyisocyanate compound, has an oxygen permeation coefficient at 23° C. under a relative humidity of 60% of 2.0 ml·mm/m²·day·MPa or smaller and comprises 20% by weight or more of a skeleton structure represented by formula (1) is provided. Since the tire has the skin layer formed with the polyurethane resin composition and having an excellent barrier property to gases, the weight of the tire can be decreased, durability can be improved and quiet driving can be achieved while the internal pressure is retained even when the gas filling the tire is the air, and the tire is more economical than tires filled with nitrogen gas. Unlike other tires using other materials having the barrier property to gases to decrease the weight, no adhesives are necessary for disposing the skin layer. Thus, the process can be simplified and the cost can be reduced in the production

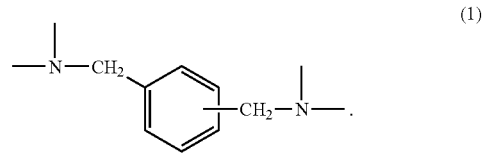

(1)

12 Claims, No Drawings

PNEUMATIC TIRE

BACKGROUND OF THE INVENTION

1. Field of the Invention

The present invention relates to a pneumatic tire (referred to a tire, hereinafter) and, more particularly, to a tire exhibiting an improved property for retention of the internal pressure and having a decreased weight.

2. Description of the Related Arts

Recently, nitrogen gas is used in place of the air for retention of the internal pressure of tires. Since the decrease in the internal pressure of a tire is mainly caused by the permeation of the oxygen component in the air, the retention of the internal pressure is improved and the frequency of the maintenance of the tire can be reduced by using nitrogen gas as the gas filling the tire. However, this method has a drawback in that the cost increases since the price of nitrogen gas is higher than that of the air and the operation of filling the tire with nitrogen gas must be repeated several times when the gas is supplemented. When a tire is filled once with nitrogen gas, the gas in the tire cannot be supplemented with the air, and nitrogen gas must be used for the supplementation. However, there are many gas stations which are not equipped with the apparatus for filling a tire with nitrogen gas, and this causes a problem in emergency.

As another method for retaining the internal pressure of a tire, a method of disposing a barrier layer to the air as an inner liner of the tire is proposed. Specifically, a rubber composition containing butyl rubber or halogenated butyl rubber is used as the main material of the inner liner. However, it is required that the inner liner has a thickness of about 1 mm since the barrier property to the air of the rubber composition is poor. When this type of inner liner is used, the weight of the tire increases by several hundred grams just for the retention of the internal pressure, and this adversely affects the decrease in the weight of the tire.

To overcome the above problem, a method of using a material having a smaller permeation of the air than that of butyl rubber or halogenated butyl rubber is proposed. For example, in Japanese Patent Application Laid-Open No. 2000-177307, a tire in which a layer not permeating the air (a barrier layer to the air) composed of an ethylene-vinyl alcohol copolymer is disposed is described. However, the ethylene-vinyl alcohol copolymer has a relatively low melting point which is occasionally 180° C. or lower, and a uniform barrier layer cannot be obtained occasionally due to melting of the copolymer during vulcanization of the tire. Polyvinyl alcohol is particularly sensitive to the effect of moisture, and problems such as a decrease in the performance due to the temperature of vulcanization occasionally arise.

To overcome the above problem, in Japanese Patent Application Laid-Open No. 2000-79804, a tire using crosslinked polyvinyl alcohol or a crosslinked ethylene-vinyl alcohol copolymer as the barrier layer to the air is proposed. However, since these materials having the barrier property are attached to the tire as a film, an adhesive is additionally necessary for attaching the film, and this causes an increase in the cost from the standpoint of economy.

The present invention has an object of overcoming the above problems and providing a pneumatic tire which exhibits excellent ability for retaining the internal pressure, a decrease in the weight, improved economy in the production and excellent durability and achieves quiet driving.

SUMMARY OF THE INVENTION

As the result of intensive studies by the present inventors to achieve the above object, it was found that a pneumatic tire which exhibits excellent ability for retaining the internal pressure, a decrease in the weight, improved economy in the production and excellent durability and achieves quiet driving can be obtained when the tire has a cured skin layer containing a specific skeleton structure which is formed by using a specific compound having active hydrogen atoms and a specific organic polyisocyanate compound as the main components, exhibits an excellent barrier property to gases.

The present invention provides a pneumatic tire comprising a skin layer which is formed by curing a polyurethane resin composition comprising a compound having active hydrogen atoms and an organic polyisocyanate compound, has an oxygen permeation coefficient at 23° C. under a relative humidity of 60% of 2.0 ml·mm/m²·day·MPa or smaller and comprises 20% by weight or more of a skeleton structure represented by formula (1):

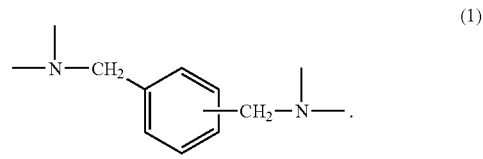

DESCRIPTION OF THE PREFERRED EMBODIMENTS

The tire of the present invention is characterized by that the skin layer is formed by curing a polyurethane resin composition comprising a compound having active hydrogen atoms and an organic polyisocyanate compound and has an oxygen permeation coefficient at 23° C. under a relative humidity of 60% of 2.0 ml·mm/m²·day·MPa or smaller, preferably 1.0 ml·mm/m²·day·MPa or smaller and more preferably 0.6 ml·mm/m²·day·MPa or smaller. The oxygen permeation coefficient is a value showing the amount of oxygen permeated through 1 square meter of a sample having a thickness of 1 mm in 24 hours.

The tire of the present invention is further characterized in that the skin layer comprises 20% by weight or more of the skeleton structure represented by formula (1). The excellent barrier property to gases is exhibited when the skin layer comprises 20% by weight or more the above skeleton structure. The gases mean the air and the components constituting the air.

In particular, the tire of the present invention exhibits the function of achieving quiet driving in addition to the barrier property to gases. To achieve the quiet driving, it is preferable that the compound having active hydrogen atoms is a compound having an odd number of atoms connecting the active hydrogen atoms, and the organic polyisocyanate compound is a compound having an odd number of atoms connecting isocyanate groups. The reason is that carbonyl groups exhibiting the polarity in the urethane bond are arranged in the same direction due to the above structures. The whole molecule exhibits ferroelectricity, and the quiet driving is achieved due to this property.

The compound having active hydrogen atoms and the organic polyisocyanate compound will be described more specifically in the following.

Compound Having Active Hydrogen Atoms

In the polyurethane resin composition used for the skin layer in the pneumatic tire of the present invention, as the compound having active hydrogen atoms, at least one compound selected from (i) addition products of alkylene oxides to polyamines, (ii) polyols having amide group, (iii) addition products of polyols to polyisocyanate compounds and (iv) polyols is preferable. The compound may be any of an aliphatic compound, an alicyclic compound, an aromatic-aliphatic compound and an aromatic compound and can be suitably selected in accordance with the application and the properties required for the application. When the exhibition of a more improved barrier property to gases and excellent adhesion with adjacent members is taken into consideration, compounds having active hydrogen atoms which have an aromatic portion or an alicyclic portion in the molecule are preferable and compounds having active hydrogen atoms which have the skeleton structure represented by formula (1) shown above in the molecule are used.

Examples of the polyamine used for the addition products of alkylene oxides to polyamines of compound (i) include aliphatic amines such as ethylenediamine, trimethylenediamine, tetramethylenediamine, pentamethylenediamine, hexamethylenediamine, ethanolamine, propanol-amine, 1,3-propanediamine and 1,5-pentamethylenediamine; alicyclic amines such as 1,3- and 1,4-bis(aminomethyl)cyclohexanes, 4,4'-, 2,4'- and 2,2'-dicyclohexylmethanediamines, isophoronediamine and norbornanediamine; aromatic-aliphatic diamines such as m- and p-xylylenediamines and 1,3- and 1,4-tetramethylxylylenediamines; and aromatic diamines such as 2,4- and 2,6-tolylenediamine, 4,4'-, 2,4'- and 2,2'-diamino-diphenylmethanes. When achieving quiet driving is taken into consideration, 1,3-propanediamine, 1,5-pentamethylenediamine, 1,3-bis(aminomethyl)cyclohexane and m-xylylenediamine are preferable.

Examples of the polyol having amido group of compound (ii) include hydroxyalkylamides.

Examples of the polyisocyanate compound used for compound (iii) include aromatic polyisocyanates such as m- and p-phenylene diisocyanates, 2,4- and 2,6-tolylene diisocyanates, 4,4'-, 2,4'- and 2,2'-diphenylmethane diisocyanates, 4,4'-toluidine diisocyanate, 4,4'-diphenyl ether diisocyanates and 1,5- and 2,6-naphthalene diisocyanate; aromatic-aliphatic polyisocyanates such as m- and p-xylylene diisocyanates and 1,3- and 1,4-tetramethylxylylene diisocyanates; alicyclic polyisocyanates such as 1,3- and 1,4-cyclohexane diisocyanate, isophorone diisocyanate, 1,3- and 1,4-bis-(isocyanatomethyl)cyclohexanes, 4,4'-, 2,4'- and 2,2'-dicyclohexylmethane diisocyanates and norbornane diisocyanate; aliphatic polyisocyanates such as hexamethylene diisocyanate; and biuret compounds, alophanate compounds, urethodione compounds and isocyanurate compounds derived from the aromatic polyisocyanates, the aromatic-aliphatic polyisocyanates, the alicyclic polyisocyanates and the aliphatic polyisocyanates described above. When achieving quiet driving is taken into consideration, 1,3-bis(isocyanatomethyl)cyclohexane and m-xylylene diisocyanate are preferable.

Examples of the polyol of compound (iv) include aliphatic polyols such as ethylene glycol, 1,2- and 1,3-propanediols, 1,3- and 1,4-butanediols, 1,5-pentanediol, 3-methyl-1,5-pentanediol, 1,6-hexanediol, 1,7-heptanediol, 1,8-octanediol, 1,9-nonanediol, 1,10-decanediol, diethylene glycol, triethylene glycol, tetraethylene glycol, dipropylene glycol, neopentyl glycol, glycerol, trimethylolpropane and pentaerythritol; alicyclic polyols such as 1,3- and 1,4-cyclohexanedimethanols; and aromatic polyols such as m- and p-xylylene glycols. When achieving quiet driving is taken into consideration, 1,3-propanediol, 1,5-pentanediol, 1,3-cyclohexanedimethanol and m-xylylene glycol are preferable.

The addition product of an alkylene oxide to a polyamine of compound (i) exhibits the excellent barrier property to gases and adhesion to adjacent members when the alkylene oxide has any number of carbon atoms. When the exhibition of a more excellent barrier property to gases and adhesion to adjacent members is taken into consideration, it is preferable that the alkylene oxide has 2 to 4 carbon atoms. The excellent barrier property to gases can be exhibited at any relative amounts of the alkylene oxide and the polyamine in the reaction. When the exhibition of a more excellent barrier property to gases and adhesion to adjacent members is taken into consideration, it is preferable that the ratio of the amounts by mole ([alkylene oxide]/[polyamine]) is in the range of 2 to 16.

As the process for the reaction of forming the addition product of an alkylene oxide to a polyamine of compound (i), the process conventionally used in this field which comprises adding the alkylene oxide to the polyamine can be used. The temperature of the reaction can be selected in the range of 20 to 150° C. in accordance with the types of the polyamine and the alkylene oxide. The obtained product has various forms ranging from the solid to the liquid at the room temperature depending on the types of the polyamine and the alkylene oxide.

As the polyol added to the polyisocyanate compound to form compound (iii), any of the polyols described as compound (iv) can be used. The excellent barrier property to gases and adhesion to adjacent members can be exhibited at any relative amounts by equivalent of the reactants. When the exhibition of a more excellent barrier property to gases and adhesion to adjacent members is taken into consideration, it is preferable that the ratio of the amounts by equivalent ([hydroxyl group in the polyol]/[NCO group in the polyisocyanate compound]) is in the range of 2 to 20. As for the process for the reaction, the order of addition of the components is not particularly limited, and various processes conventionally used in this field can be used. For example, each component in the entire amount may be successively or simultaneously mixed together or, where necessary, an additional amount of the polyisocyanate compound may be suitably added during the reaction. Where necessary, organic solvents may be used for the reaction. Examples of the organic solvent include toluene, xylene, ethyl acetate, butyl acetate, cellosolve acetate, acetone, methyl ethyl ketone, methyl isobutyl ketone, tetrahydrofuran, dimethylformamide and dimethylacetamide. The organic solvent may be used singly or in combination of two or more. As the reaction accelerator, conventional organometallic compounds (lead compounds and tin compounds) and tertiary amines can be used in the reaction, where necessary. The reaction can be conducted at a temperature in the range of 20 to 160° C. in accordance with the types of the polyisocyanate compound and the polyol. The obtained product has various forms ranging from the solid to the liquid at the room temperature depending on the types of the polyisocyanate compound and the polyol.

As the compound having active hydrogen atoms in the polyurethane resin composition used for the skin layer in the tire of the present invention, the compound having active hydrogen atoms described above may be used singly or as a mixture obtained by mixing a plurality of the compounds having active hydrogen atoms described above in suitable relative amounts so that properties such as flexibility, impact strength and resistance to moisture and heat are improved.

As the compound having active hydrogen atoms in the polyurethane resin composition, the addition products of alkylene oxides to aromatic-aliphatic polyamines, the addition products of polyols to aromatic-aliphatic polyisocyanate compounds and the aromatic-aliphatic polyols are preferable, and the addition products of alkylene oxides to aromatic-aliphatic polyamines are more preferable when the exhibition of a more improved barrier property to gases and adhesion with the tire is taken into consideration.

Organic Polyisocyanate Compound

In the polyurethane resin composition used for the skin layer in the tire of the present invention, as the organic polyisocyanate compound, a compound which is a reaction product of (a) a polyfunctional isocyanate compound and (b) a polyhydric alcohol or a reaction products of (a) a polyfunctional isocyanate compound, (b) a polyhydric alcohol and (c) at least one compound selected from alkanolamines, polyfunctional amines, and polyfunctional carboxylic acids and has at least two NCO groups at the ends of a molecule is preferable. The organic polyisocyanate compound may be any of an aliphatic compound, an alicyclic compound, an aromatic-aliphatic compound and an aromatic compound and can be suitably selected in accordance with the application and the properties required for the application. When the exhibition of a more excellent barrier property to gases and adhesion with adjacent members is taken into consideration, organic polyisocyanate compounds having an aromatic portion or an alicyclic portion in the molecule are preferable and organic polyisocyanate compounds having the skeleton structure represented by formula (1) can be used. The excellent barrier property to gases and the excellent adhesion with adjacent members are exhibited at any relative amounts by equivalent of component (a) and component (b) or component (a), component (b) and component (c). When the exhibition of a more excellent barrier property to gases and adhesion with adjacent members is taken into consideration, it is preferable that the ratio of the amounts by equivalent ([component (a)]/[component (b)] or [component (a)]/[component (b)+component (c)]) is in the range of 2 to 30.

As for the process for forming the organic polyisocyanate compound, the order of addition of components (a), (b) and (c) described above is not particularly limited, and various processes conventionally used in this field can be used. For example, each component in the entire amount may be mixed simultaneously or successively, or an additional amount of the polyfunctional isocyanate compound may be added further during the reaction, where necessary. Where necessary, organic solvents may be used for the reaction. Examples of the organic solvent include toluene, xylene, ethyl acetate, butyl acetate, cellosolve acetate, acetone, methyl ethyl ketone, methyl isobutyl ketone, tetrahydrofuran, dimethyl-formamide and dimethylacetamide. The organic solvent may be used singly or in combination of two or more. As the reaction accelerator, conventional organometallic compounds (lead compounds and tin compounds) and tertiary amines can be used in the reaction, where necessary. The reaction can be conducted at a temperature in the range of 20 to 200° C. in accordance with the types of components (a), (b) and (c). The obtained product has various forms ranging from the solid to the liquid depending on the types of components (a), (b) and (c). When unreacted component (a) in an excess amount is present in the reaction product of components (a) and (b) or in the reaction product of components (a), (b) and (c), the unreacted component can be removed from the reaction product in accordance with a conventional process such as the thin film distillation and the extraction.

The polyfunctional isocyanate compound of component (a) can be used singly or in combination of two or more in accordance with the application and the properties required for the application. Examples of the polyfunctional isocyanate compound include aromatic polyisocyanate compounds such as m- and p-phenylene diisocyanates, 2,4- and 2,6-tolylene diisocyanates, 4,4'-, 2,4'- and 2,2'-diphenylmethane diisocyanates, 4,4'-toluidine diisocyanate, 4,4'-diphenyl ether diisocyanate and 1,5- and 2,6-naphthalene diisocyanates; aromatic-aliphatic polyisocyanate compounds such as m- and p-xylylene diisocyanates and 1,3- and 1,4-tetramethylxylylene diisocyanates; alicyclic polyisocyanate compounds such as 1,3- and 1,4-cyclohexane diisocyanates, isophorone diisocyanate, 1,3- and 1,4-bis(isocyanatomethyl)cyclohexanes, 4,4'-, 2,4'- and 2,2'-dicyclohexylmethane diisocyanates and norbornane diisocyanate; aliphatic polyisocyanates such as hexamethylene diisocyanate; and biuret compounds, alophanate compounds, urethodione compounds and isocyanurate compounds derived from the aromatic polyisocyanate compounds, the aromatic-aliphatic polyisocyanate compounds, the alicyclic polyisocyanate compounds and the aliphatic polyisocyanate compounds described above.

When the polyfunctional isocyanate compound of component (a) is used as the organic polyisocyanate compound, at least one compound selected from xylylene diisocyanates and biuret compounds, alophanate compounds, urethodione compounds and isocyanurate compounds which are derived from xylylene diisocyanates is preferable and xylylene diisocyanates are more preferable as the polyfunctional isocyanate compound of component (a) when the exhibition of a more excellent barrier property to gases and adhesion with the tire is taken into consideration.

The polyhydric alcohol of component (b) is at least one polyhydric alcohol selected from polyhydric alcohols having 2 to 10 carbon atoms and can be suitably selected in accordance with the application and the properties required for the application. Examples of the polyhydric alcohol include aliphatic polyols such as ethylene glycol, 1,2- and 1,3-propanediols, 1,3- and 1,4-butanediol, 1,5-pentanediol, 3-methyl-1,5-pentanediol, 1,6-hexanediol, 1,7-heptanediol, 1,8-octanediol, 1,9-nonane diol, 1,10-decanediol, diethylene glycol, triethylene glycol, tetramethylene glycol, dipropylene glycol, neopentyl glycol, glycerol, trimethylolpropane and pentaerythritol; alicyclic polyols such as 1,3- and 1,4-cyclohexanedimethaonol; and aromatic polyols such as m- and p-xylylene glycols.

Component (c) is at least one compound selected from aromatic polyfunctional amines, aromatic-aliphatic polyfunctional amines, alicyclic polyfunctional amines, aliphatic polyfunctional amines, aliphatic alkanolamines, aromatic polybasic carboxylic acids, alicyclic polybasic carboxylic acids and aliphatic polybasic carboxylic acids and can be suitably selected in accordance with the application and the properties required for the application.

Examples of the aromatic polyfunctional amine include 2,4- and 2,6-tolylene diamines and 4,4'-, 2,4'- and 2,2'-diaminodiphenylmethanes. Examples of the aromatic-aliphatic polyfunctional amine include m- and p-xylylenediamines and 1,3- and 1,4-tetramethylxylenediamines. Examples of the alicyclic polyfunctional amine include 1,3- and 1,4-bis(aminomethyl)cyclohexanes, 4,4'-, 2,4'- and 2,2'-dicyclohexylmethanediamines, isophoronediamine and norbornanediamine. Examples of the aliphatic polyfunctional amine include ethylenediamine, trimethylenediamine, tetramethylenediamine, pentamethylenediamine and hexamethylenediamine. Examples of the aliphatic alkanolamine include ethanolamine and propanolamine. Examples of the aromatic polycarboxylic acid include isophthalic acid, terephthalic acid, 2,6-naphthalenedicarboxylic acid, paraphenylenedicarboxylic acid, trimellitic acid and pyromellitic acid. Examples of the alicyclic polyfunctional carboxylic acid include 1,3-cyclohexanedicarboxylic acid and 1,4-cyclohexanedicarboxylic acid. Examples of the aliphatic polyfunctional carboxylic acid include malonic acid, succinic acid, adipic acid, suberic acid, azelaic acid, sebacic acid and dodecandionic acid.

Polyurethane Resin Composition

In the polyurethane resin composition used for the skin layer in the tire of the present invention, a combination of a compound having active hydrogen atoms which is a compound having an odd number of atoms connecting the active hydrogen atoms and an organic polyisocyanate compound which is a compound having an odd number of atoms connecting isocyanate groups is preferable when achieving quiet driving is taken into consideration. Examples of the organic polyisocyanate compound include 1,3-bis(isocyanatomethyl)cyclohexane and m-xylylene diisocyanate. Examples of the compound having active hydrogen atoms include 1,3-propanediol, 1,5-pentanediol, 1,3-cyclohexanedimethanol, m-xylylene glycol and 1-amino-3-hydroxypropane.

The polyurethane resin composition comprises the skeleton structure represented by formula (1) in an amount of 20% by weight or more, preferably 25% by weight or more and more preferably 30% by weight or more in the cured resin formed by the reaction of the compound having active hydrogen atoms and the organic polyisocyanate compound. The more excellent barrier property to gases and adhesion to adjacent members can be exhibited since the skeleton structure represented by formula (1) is comprised in an amount of 20% or more.

The polyurethane resin composition used for the skin layer of the tire of the present invention can be applied to any coating layer without particular restrictions. In general, the above composition is applied to an inner liner layer, a gas barrier layer between a carcass layer and a side rubber layer or an adhesive layer conventionally used for various members constituting the tire.

The tire in which the above composition is applied to the above coating layer is not particularly limited. The above composition can be applied advantageously in radial tires for passenger cars and radial tires for buses.

The relative amounts of the compound having active hydrogen atoms and the organic polyisocyanate compound which are the main components of the skin layer may be in the range generally used for preparing a cured product of a polyurethane resin by the reaction of the component comprising the compound having active hydrogen atoms as the main component and the component comprising the organic polyisocyanate compound as the main component. Specifically, the ratio of the number of isocyanate group to the total of the number of hydroxyl group and the number of amino group in the compound having active hydrogen atoms is in the range of 0.8 to 3.0 and preferably in the range of 0.9 to 2.0.

A wetting agent such as a silicone compound and an acrylic compound may be added to the polyurethane resin composition, where necessary, so that wetting of the surface in application to a member of the tire is enhanced. Examples of the suitable wetting agent include BYK331, BYK333, BYK348 and BYK381 available from BYK Chemie GmbH. When the wetting agent is added, it is preferable that the amount is in the range of 0.01 to 2.0% by weight based on the weight of the entire polyurethane resin composition.

When the polyurethane resin composition is applied to the inner surface of the tire or to a member of the tire, where necessary, a tackifier such as a xylene resin, a terpene resin, a phenol resin and a rosin resin may be added so that the adhesive property immediately after the application is improved. When the tackifier is added, it is preferable that the amount is in the range of 0.01 to 5.0% by weight based on the weight of the entire polyurethane resin composition.

An inorganic filler such as silica, alumina, mica, talc, aluminum flakes and glass flakes may be added to the polyurethane resin composition so that the properties such as the barrier property to gases, the impact resistance and the heat resistance of the skin layer formed from the polyurethane resin composition are improved. When the inorganic filler is added, it is preferable that the amount is in the range of 0.01 to 10.0% by weight based on the weight of the entire polyurethane resin composition.

A coupling agent such as a silane coupling agent and a titanium coupling agent may be added to the polyurethane resin composition so that the adhesive property of the skin layer formed from the polyurethane resin composition to the member of the tire is improved. When the coupling agent is added, it is preferable that the amount is in the range of 0.01 to 5.0% by weight based on the weight of the entire polyurethane resin composition.

Skin Layer

In the tire of the present invention, it is practically advantageous that the thickness of the skin layer is in the range of about 1 to 100 µm and preferably 5 to 30 µm. When the thickness is smaller than 0.1 µm, the barrier property to gases is not sufficiently exhibited. When the thickness exceeds 100 µm, there is the great possibility that the layer is fractured due to the bending deformation during rolling of the tire. Moreover, it is difficult that the layer follows the deformation of elongation arising during the production of the tire.

Since the skin layer in the tire of the present invention is formed by curing the polyurethane resin composition, the skin layer does not melt under heating during vulcanization, and the desired properties of the tire can be surely obtained.

The skin layer is formed by curing the polyurethane resin composition. As the process for applying the polyurethane resin composition to the inside of the tire as the inner liner, a process can be suitably selected from various coating processes such as coating by a roll, coating by squeezing, coating by brushing, coating by casting, coating by dipping and coating by spraying. When the coating is conducted, the concentration is adjusted at a value sufficient for obtaining the cured product of the polyurethane resin. The concentration can be changed by selecting the materials at the beginning. The concentration of the polyurethane resin composition in the coating fluid can be selected in a wide range from the condition without dilution with solvents to a condition having a concentration of about 5% by weight in a suitable organic solvent depending on the type of the materials and the relative amounts by equivalent of the materials.

The organic solvent used above is not particularly limited as long as the organic solvent is inert to the reaction. Examples of the organic solvent include aromatic hydrocarbons such as toluene and xylene; ketones such as acetone, methyl ethyl ketone and methyl isobutyl ketone; ethers such as tetrahydrofuran and dioxane; esters such as ethyl acetate and butyl acetate; nitriles such as acetonitrile; and amides such as dimethylformamide and dimethylacetamide. The organic solvent may be used singly or in combination of two or more. In the reaction for forming polyurethane and/or polyurea, a catalyst for forming polyurethanes such as amine-based catalysts, tin-based catalysts and lead-based catalyst can be singly or in combination of two or more, where necessary.

After the above treatments are completed, it is possible that the amount of the coating material can be adjusted and the appearance and the thickness of the layer are made uniform in accordance with the method using an air knife or the method of squeezing by a roll. After the polyurethane resin composition is applied, the curing reaction of the skin layer may be completed using a heating apparatus, where necessary. For the heating of the tire by a heating apparatus, a process can be suitably selected from conventional processes such as the heating by a dryer, the high frequency induction heating, the heating with far infrared light and the heating with a gas. It is preferable that the heating treatment is conducted at 50 to 300° C. and more preferably at 70 to 200° C. as the temperature of the material during the treatment.

Since urethane group is present in the skin layer of the tire of the present invention at a high level due to the curing of the polyurethane resin composition, an excellent adhesion to the members in contact with the skin layer can be surely achieved, and no additional adhesive is necessary between the skin layer and the tire. However, when a further improved adhesion is necessary, an adhesive such as chlorinated rubber-isocyanate-based adhesive may be used between the tire and the skin layer, where necessary.

Auxiliary Layer

It is preferable that the tire of the present invention comprises, in combination with the skin layer described above, an auxiliary layer which is in contact with the skin layer, disposed at the side of the filled air or at the side opposite to the side of the filled air and made of an elastomer having an oxygen permeation coefficient of 5,000 ml·mm/m$^2$·day·MPa or smaller. The auxiliary layer is disposed so that the internal pressure is retained by the auxiliary layer when pin holes or cracks are formed in the skin layer. It is preferable that the skin layer and the auxiliary layer are adhered together since the cleavage of the layers is suppressed and the skin layer remains without changes at almost entire portions of the surface containing the air and continuously exhibits the function of retaining the internal pressure. In this case, the thickness of the auxiliary layer can be made smaller than the thickness of the conventional inner liner of about 1 mm. It is preferable that the thickness of the auxiliary layer is in the range of 50 to 500 μm. When the thickness is smaller than 50 mm, the production is difficult, and the barrier effect to gases is small even when the production is possible. When the thickness exceeds 500 mm, the effect of decreasing the weight of the tire cannot be obtained.

When the auxiliary layer is disposed, it may be conducted that the elastomer layer forming the auxiliary layer is formed immediately after the polyurethane resin composition for forming the skin layer is applied to the tire, and the skin layer is formed thereafter by curing the polyurethane resin composition.

Since the tire of the present invention comprises the skin layer which is formed from the polyurethane resin composition and has a great barrier property to gases, the weight of the tire can be reduced while the internal pressure of the tire is retained even when the gas filling the inside of the tire is the air. The tire exhibits excellent durability, achieves quiet driving and is economically more excellent than tires filled with nitrogen. In comparison with tires having a reduced weight by the use of other barrier materials, the process of the production can be simplified and the cost of the production can be decreased since the use of an adhesive is not necessary for disposing the skin layer.

EXAMPLES

The present invention will be described more specifically with reference to examples in the following. However, the present invention is not limited to the examples.

The properties of the automobile tires obtained in Examples and Comparative Examples were measured in accordance with the following methods.

1) Retention of the Internal Pressure After Driving for 10,000 km

A prepared tire inflated at an air pressure of 300 KPa was pushed against a drum rotating at a speed corresponding to 80 km/hr, and the internal pressure after driving for 10,000 km was measured. The retention of the internal pressure is expressed as the value relative to the value in Comparative Example 1 which was set at 100.

2) Retention of the Internal Pressure After Driving for 50,000 km

A prepared tire inflated at an air pressure of 300 KPa was pushed against a drum rotating at a speed corresponding to 80 km/hr, and the internal pressure after driving for 50,000 km was measured. The retention of the internal pressure is expressed as the value relative to the value obtained after driving for 10,000 km in Comparative Example 1 which was set at 100.

3) Retention of the Internal Pressure After Storage for 1 Year

A prepared tire inflated at an air pressure of 300 KPa was pushed against a drum rotating at a speed corresponding to 80 km/hr and driven for 50,000 km. Then, the tire was kept for 1 year, and the internal pressure was measured after the storage. The retention of the internal pressure is expressed as the value relative to the value obtained after driving for 10,000 km in Comparative Example 1 which was set at 100.

4) Decrease in the Weight of a Tire

The weight of a prepared tire was measured. The decrease in the weight is expressed as the percentage based on the weight of the tire in Comparative Example 1 (a conventional tire).

5) Noise Test of a Tire

Noise of a prepared tire was measured at speeds of 50 km/hr and 80 km/hr in accordance with the method of JASO C606.

Compound Having Active Hydrogen Atoms A

Into a reactor, 1 mole of meta-xylylenediamine was placed. Under a stream of nitrogen gas, the temperature was elevated to 50° C., and 4 moles of ethylene oxide was added dropwise over 5 hours. After the addition was completed, the resultant mixture was stirred at 100° C. for 5 hours, and compound having active hydrogen atoms A was obtained. Compound having active hydrogen atoms A was a compound having 7 or 13 atoms, i.e., an odd number of atoms, connecting the active hydrogen atoms.

Compound Having Active Hydrogen Atoms B

Into a reactor, 1 mole of meta-xylylenediamine was placed. Under a stream of nitrogen gas, the temperature was elevated to 50° C., and 4 moles of propylene oxide was added dropwise over 5 hours. After the addition was completed, the resultant mixture was stirred at 100° C. for 5 hours, and compound having active hydrogen atoms B was obtained.

Compound Having Active Hydrogen Atoms C

Into a reactor, 20 mole of ethylene glycol was placed. Under a stream of nitrogen gas, the temperature was elevated to 80° C., and 1 mole of meta-xylylene diisocyanate was added dropwise over 1 hour. After the addition was completed, the resultant mixture was stirred at 80° C. for 2 hours. The obtained reaction product was distilled using a thin film distillation apparatus of 0.03 m$^2$ under a degree of vacuum of 1.0 Torr (133 Pa) at a distillation temperature of 180° C. with a rate of supply of 5 g/min, and compound having active hydrogen atoms C containing 0.6% by weight of residual ethylene glycol was obtained.

Compound Having Active Hydrogen Atoms D

As compound having active hydrogen atoms D, 1,4-butanediol was used.

Organic Polyisocyanate Compound a

Into a reactor, 8 moles of meta-xylylene diisocyanate (a compound having 5 or 9 atoms, i.e., an odd number of atoms, connecting isocyanate groups) was placed. Under a stream of nitrogen gas, the temperature was elevated to 80° C., and 1 mole of 1,3-propanediol (a compound having 5 atoms, i.e., an odd number of atoms, connecting active hydrogen atoms) was added dropwise over 2 hours. After the addition was completed, the resultant mixture was stirred at 80° C. for 2 hours. The obtained reaction product was distilled using a thin film distillation apparatus of 0.03 m$^2$ under a degree of vacuum of 1.0 Torr (133 Pa) at a distillation temperature of 180° C. with a rate of supply of 5 g/min, and organic polyisocyanate compound a containing 0.8% by weight of residual meta-xylylene diisocyanate was obtained.

Organic Polyisocyanate Compound b

Into a reactor, 5 moles of meta-xylylene diisocyanate was placed. Under a stream of nitrogen gas, the temperature was elevated to 80° C., and 1 mole of diethylene glycol was added dropwise over 2 hours. After the addition was completed, the resultant mixture was stirred at 80° C. for 2 hours. The obtained reaction product was distilled using a thin film distillation apparatus of 0.03 m$^2$ under a degree of vacuum of 1.0 Torr (133 Pa) at a distillation temperature of 180° C. with a rate of supply of 5 g/min, and organic polyisocyanate compound b containing 0.5% by weight of residual meta-xylylene diisocyanate was obtained.

Organic Polyisocyanate Compound c

Into a reactor, 12 moles of meta-xylylene diisocyanate was placed. Under a stream of nitrogen gas, the temperature was elevated to 80° C., and 1 mole of glycerol (a compound having 5 atoms, i.e., an odd number of atoms, connecting active hydrogen atoms to hydrogen atom of hydroxyl group bonded to the methylene carbon atom at the 2-position) was added dropwise over 5 hours. After the addition was completed, the resultant mixture was stirred at 80° C. for 2 hours. The obtained reaction product was distilled using a thin film distillation apparatus of 0.03 m$^2$ under a degree of vacuum of 1.0 Torr (133 Pa) at a distillation temperature of 180° C. with a rate of supply of 3 g/min, and organic polyisocyanate compound c containing 1.0% by weight of residual meta-xylylene diisocyanate was obtained.

Organic Polyisocyanate Compound d

Into a reactor, 6 moles of meta-xylylene diisocyanate was placed. Under a stream of nitrogen gas, the temperature was elevated to 80° C., and 1 mole of trimethylolpropane was added dropwise over 3 hours. After the addition was completed, the resultant mixture was stirred at 80° C. for 2 hours. The obtained reaction product was distilled using a thin film distillation apparatus of 0.03 m$^2$ under a degree of vacuum of 1.0 Torr (133 Pa) at a distillation temperature of 180° C. with a rate of supply of 5 g/min, and organic polyisocyanate compound d containing 0.5% by weight of residual meta-xylylene diisocyanate was obtained.

Organic Polyisocyanate Compound e

Into a reactor, 6 moles of tolylene diisocyanate was placed. Under a stream of nitrogen gas, the temperature was elevated to 80° C., and 1 mole of trimethylolpropane was added dropwise over 3 hours. After the addition was completed, the resultant mixture was stirred at 80° C. for 2 hours. The obtained reaction product was distilled using a thin film distillation apparatus of 0.03 m$^2$ under a degree of vacuum of 1.0 Torr (133 Pa) at a distillation temperature of 180° C. with a rate of supply of 5 g/min, and organic polyisocyanate compound e containing 0.6% by weight of residual tolylene diisocyanate was obtained.

Organic Polyisocyanate Compound f

Into a reactor, 3 moles of 1,3-bis(isocyanatomethyl)cyclohexane and 3 moles of meta-xylylene diisocyanate were placed. Under a stream of nitrogen gas, the temperature was elevated to 80° C., and 1 mole of trimethylolpropane was added dropwise over 3 hours. After the addition was completed, the resultant mixture was stirred at 80° C. for 2 hours. The obtained reaction product was distilled using a thin film distillation apparatus of 0.03 m$^2$ under a degree of vacuum of 1.0 Torr (133 Pa) at a distillation temperature of 180° C. with a rate of supply of 5 g/min, and organic polyisocyanate compound f containing 0.5% by weight of the residual isocyanates as the sum of the amounts of residual 1,3-bis(isocyanatomethyl)cyclohexane and meta-xylylene diisocyanate was obtained.

Example 1

Compound having active hydrogen atoms A in an amount of 100 parts by weight and 342 parts by weight of organic polyisocyanate compound a were mixed, and the concentration of solid components was adjusted at 35% by weight with a mixed solvent containing acetone and ethyl acetate in relative amounts of 1/0.3. To the resultant mixture, 0.02 parts by weight of an acrylic wetting agent (BYK381 manufactured by BYK Chemie GmbH) was added and mixed well, and a coating fluid of a polyurethane resin composition was prepared. The prepared coating fluid of the polyurethane resin composition was applied to a radial tire for passenger cars (195-70-R14) as the inner liner. After a skin layer having a thickness of about 20 μm was formed by curing at 80° C. for 30 minutes, the tire was vulcanized, and an automobile tire was prepared. The content of the skeleton structure represented by formula (1) in the skin layer was 55.3% by weight, and the oxygen permeation coefficient of the skin layer at 23° C. under a relative humidity of 60% was 0.30 ml·mm/m$^2$·day·MPa.

The retention of the internal pressure after driving for 10,000 km and the decrease in the weight of the tire are shown in Table 1.

Example 2

A radial tire for passenger cars was prepared in accordance with the same procedures as those conducted in Example 1 except that 401 parts by weight of organic polyisocyanate compound b was used in place of 342 parts by weight of organic polyisocyanate compound a. The content of the skeleton structure represented by formula (1) in the skin layer was 48.0% by weight, and the oxygen permeation coefficient of the skin layer at 23° C. under a relative humidity of 60% was 0.40 ml·mm/m$^2$·day·MPa. The retention of the internal pressure after driving for 10,000 km and the decrease in the weight of the tire are shown in Table 1.

Example 3

A radial tire for passenger cars was prepared in accordance with the same procedures as those conducted in Example 1 except that 347 parts by weight of organic polyisocyanate compound c was used in place of 342 parts by weight of organic polyisocyanate compound a. The content of the skeleton structure represented by formula (1) in the skin layer was 53.6% by weight, and the oxygen permeation coefficient of the skin layer at 23° C. under a relative humidity of 60% was 0.35 ml·mm/m$^2$·day·MPa.

The retention of the internal pressure after driving for 10,000 km, the decrease in the weight of the tire and the result of the noise test are shown in Table 1. The retention of the internal pressure after the driving of the tire in comparison with that before the driving was more excellent than that of the conventional tire, and the effect of preventing the tire noise was also exhibited.

Example 4

A radial tire for passenger cars was prepared in accordance with the same procedures as those conducted in Example 1 except that 429 parts by weight of organic polyisocyanate compound d was used in place of 342 parts by weight of organic polyisocyanate compound a. The content of the skeleton structure represented by formula (1) in the skin layer was 45.6% by weight, and the oxygen permeation coefficient of the skin layer at 23° C. under a relative humidity of 60% was 0.65 ml·mm/m$^2$·day·MPa. The retention of the internal pressure after driving for 10,000 km and the decrease in the weight of the tire are shown in Table 1.

Example 5

A radial tire for passenger cars was prepared in accordance with the same procedures as those conducted in Example 1 except that 452 parts by weight of organic polyisocyanate compound f was used in place of 342 parts by weight of organic polyisocyanate compound a. The content of the skeleton structure represented by formula (1) in the skin layer was 23.4% by weight, and the oxygen permeation coefficient of the skin layer at 23° C. under a relative humidity of 60% was 1.00 ml mm/m$^2$·day·MPa. The retention of the internal pressure after driving for 10,000 km and the decrease in the weight of the tire are shown in Table 1.

Example 6

A radial tire for passenger cars was prepared in accordance with the same procedures as those conducted in Example 1 except that 100 parts by weight of compound having active hydrogen atoms B was used in place of 100 parts by weight of compound having active hydrogen atoms A and 295 parts by weight of organic polyisocyanate compound a was used. The content of the skeleton structure represented by formula (1) in the skin layer was 51.6% by weight, and the oxygen permeation coefficient of the skin layer at 23° C. under a relative humidity of 60% was 0.35 ml·mm/m$^2$·day·MPa. The retention of the internal pressure after driving for 10,000 km and the decrease in the weight of the tire are shown in Table 1.

Example 7

A radial tire for passenger cars was prepared in accordance with the same procedures as those conducted in Example 1 except that 100 parts by weight of compound having active hydrogen atoms C was used in place of 100 parts by weight of compound having active hydrogen atoms A and 217 parts by weight of organic isocyanate compound c was used in place of 342 parts by weight of organic polyisocyanate compound a. The content of the skeleton structure represented by formula (1) in the skin layer was 60.1% by weight, and the oxygen permeation coefficient of the skin layer at 23° C. under a relative humidity of 60% was 0.75 ml·mm/m$^2$·day·MPa. The retention of the internal pressure after driving for 10,000 km and the decrease in the weight of the tire are shown in Table 1.

Example 8

A radial tire for passenger cars was prepared in accordance with the same procedures as those conducted in Example 1 except that 100 parts by weight of compound having active hydrogen atoms D was used in place of 100 parts by weight of compound having active hydrogen atoms A and 247 parts by weight of organic isocyanate compound d was used in place of 342 parts by weight of organic polyisocyanate compound a. The content of the skeleton structure represented by formula (1) in the skin layer was 42.1% by weight, and the oxygen permeation coefficient of the skin layer at 23° C. under a relative humidity of 60% was 1.50 ml·mm/m$^2$·day·MPa. The retention of the internal pressure after driving for 10,000 km and the decrease in the weight of the tire are shown in Table 2.

Example 9

Immediately after the polyurethane resin composition used in Example 1 was applied to a tire as the inner liner, an auxiliary layer of butyl rubber (the oxygen permeation coefficient at 23° C. under a relative humidity of 60%: 3,500 ml·mm/m$^2$·day·MPa) having a thickness of 200 μm was placed on the formed coating layer. The polyurethane resin composition was cured at 80° C. for 30 minutes to form a skin layer having a thickness of about 20 μm, and a radial tire for passenger cars was prepared. The retention of the internal pressure after driving for 10,000 km and the decrease in the weight of the tire are shown in Table 2.

When the auxiliary layer was absent, the effect of decreasing the weight was great although the retention of the internal pressure decreased slightly. When the auxiliary layer was added, the internal pressure could be surely retained while the effect of decreasing the weight of the tire could be sufficiently exhibited.

Comparative Example 1

An inner liner having a thickness of 1,000 μm was formed with brominated butyl rubber as the barrier layer, and a radial tire for passenger cars was prepared. The retentions of the internal pressure after driving for 10,000 km and 50,000 km, the retention of the internal pressure after storage for 1 year, the decrease in the weight of the tire and the result of the noise test of the tire are shown in Table 2.

Comparative Example 2

An inner liner having a thickness of 20 μm was formed with an ethylene-vinyl alcohol copolymer (manufactured by KURARAY Co., Ltd.; EVOH-F) as the barrier layer. The formed barrier layer was crosslinked by irradiation with electron beams under a voltage of acceleration of 300 KV with an energy of irradiation of 20 Mrad, and a radial tire for passenger cars was prepared. The layer was adhered to the adjacent member with a chlorinated rubber-based adhesive. The retentions of the internal pressure after driving for 10,000 km and 50,000 km, the retention of the internal pressure after storage for 1 year, the decrease in the weight of the tire and the result of the noise test of the tire are shown in Table 2.

Comparative Example 3

A radial tire for passenger cars was prepared in accordance with the same procedures as those conducted in Example 1 except that 418 parts by weight of organic polyisocyanate compound e was used in place of 342 parts by weight of organic polyisocyanate compound a. The content of the skeleton structure represented by formula (1) in the skin layer was 9.3% by weight, and the oxygen permeation coefficient of the skin layer at 23° C. under a relative humidity of 60% was 3.80 ml·mm/m²·day·MPa. The retention of the internal pressure after driving for 10,000 km and the decrease in the weight of the tire are shown in Table 2.

Example 10

In accordance with the same procedures as those conducted in Example 1, compound having active hydrogen atoms A and organic polyisocyanate compound a used in Example 1, which formed a polymer having a skeleton structure having carbonyl groups separated by an odd number of atoms, were mixed, and a composition prepared by diluting the formed polymer with a mixed solvent containing acetone and ethyl acetate was applied to a carcass layer as the inner liner layer which constituted the inside of the tire and retained the barrier property for gases. The formed coating layer was cured by heating at 80° C. for 30 minutes so that a skin layer having a thickness of about 10 μm was formed. To the side of the carcass layer opposite to the side coated above with the inner liner (at the side of the side rubber), the above composition was applied so that a coating layer having a thickness of about 10 μm was formed. Thus, the coating layers were formed on both sides of the carcass, and a radial tire for passenger cars was prepared.

The retentions of the internal pressure after driving for 10,000 km and 50,000 km, the retention of the internal pressure after storage for 1 year, the decrease in the weight of the tire and the result of the noise test of the tire are shown in Table 2. The retention of the internal pressure after the driving of the tire in comparison with that before the driving was more excellent than that of the conventional tire, and the effect on preventing tire noise was also exhibited.

Comparative Example 4

The carcass layer of a tire was coated with polyvinyl alcohol layer having a thickness of 20 μm as the inner liner, and the side of the carcass at the opposite side to the side coated with the inner liner (the side of the side rubber) was coated with a polyvinyl alcohol layer having a thickness of 20 μm.

To surely obtain the adhesion between the members, both sides of the carcass layer and adjacent members including the side rubber were coated with a chlorinated rubber-based adhesive. Using these members, a radial tire for passenger cars was prepared.

The decrease in the weight of the tire and the result of the noise test of the tire are shown in Table 2. The retention of the internal pressure after driving for 50,000 km could not be measured due to burst of the tire.

TABLE 1

| | Example | | | | | | |
|---|---|---|---|---|---|---|---|
| | 1 | 2 | 3 | 4 | 5 | 6 | 7 |
| Polyurethane resin composition for skin layer | | | | | | | |
| compound having active hydrogen atoms | A | A | A | A | A | B | C |
| organic polyisocyanate compound | a | b | c | d | f | a | a |
| Thickness of skin layer (μm) | 20 | 20 | 20 | 20 | 20 | 20 | 20 |
| Oxygen permeation coefficient (ml · mm/ m² · day · MPa) | 0.30 | 0.40 | 0.35 | 0.65 | 1.00 | 0.35 | 0.75 |
| Content of skeleton structure represented by formula (1) (%) | 55.3 | 48.0 | 53.6 | 45.6 | 23.4 | 51.6 | 60.1 |
| Adhesive | none | none | none | none | none | none | none |
| Properties of tire | | | | | | | |
| retention of internal pressure (%) after driving for 10,000 km | 85 | 95 | 95 | 90 | 80 | 95 | 90 |
| decrease in weight of tire (%) | 5.8 | 5.8 | 5.8 | 5.8 | 5.8 | 5.8 | 5.8 |
| result of noise test of tire (db) | | | | | | | |
| driving at 50 km/hr | | | 55 | | | | |
| driving at 80 km/hr | | | 70 | | | | |

TABLE 2

| | Example | | | Comparative Example | | | |
|---|---|---|---|---|---|---|---|
| | 8 | 9 | 10 | 1 | 2 | 3 | 4 |
| Polyurethane resin composition for skin layer | | | | | | | |
| compound having active | D | A | A | | | A | |

TABLE 2-continued

|  | Example | | | Comparative Example | | | |
| --- | --- | --- | --- | --- | --- | --- | --- |
|  | 8 | 9 | 10 | 1 | 2 | 3 | 4 |
| hydrogen atoms organic polyisocyanate compound | a | a | a |  |  | e |  |
| Thickness corresponding to inner liner (μm) | | | | | | | |
| skin layer | 20 | 20 | 10 + 10 |  |  | 20 |  |
| auxiliary layer |  | 200 |  |  |  |  |  |
| brominated butyl rubber |  |  |  | 1000 |  |  |  |
| polyvinyl alcohol |  |  |  |  | 20 |  | 20 + 20 |
| Oxygen permeation coefficient (ml · mm/ m² · day · MPa) | 1.50 | 0.30 | 0.30 |  |  | 3.8 |  |
| Content of skeleton structure represented by formula (1) (%) | 42.1 | 55.3 | 55.3 |  |  | 9.3 |  |
| Adhesive | none | none | none | none | used | none | used |
| Properties of tire retention of internal pressure (%) | | | | | | | |
| after driving for 10,000 km | 85 | 100 | 100 | 100 | 70 | 60 | nm* |
| after driving for 50,000 km |  | 100 | 100 | 90 | 30 |  |  |
| after driving for 50,000 and storage for 1 year |  | 100 | 100 | 40 | 25 |  |  |
| decrease in weight of tire (%) | 5.8 | 4.7 | 5.6 | 0 | 5.4 | 5.8 | 2.5 |
| result of noise test of tire (db) | | | | | | | |
| driving at 50 km/hr |  | 50 |  | 65 | 70 |  | 80 |
| driving at 80 km/hr |  | 65 |  | 80 | 85 |  | 100 |

*Not measurable.

What is claimed is:

1. A pneumatic tire comprising a skin layer which is formed by curing a polyurethane resin composition comprising a compound having active hydrogen atoms and an organic polyisocyanate compound, has an oxygen permeation coefficient at 23° C. under a relative humidity of 60% of 2.0 ml·mm/m²·day·MPa or smaller and comprises 20% by weight or more of a skeleton structure represented by formula (1):

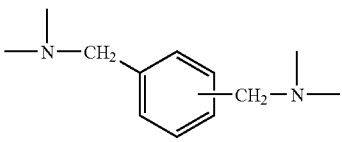

wherein the compound having active hydrogen atoms is at least one compound selected from addition products of alkylene oxides to aromatic-aliphatic polyamines, addition products of polyols to aromatic-aliphatic polyisocyanate compounds and aromatic-aliphatic polyols, and wherein said pneumatic tire further comprises an auxiliary layer, having a thickness in a range of 50 to 500 μm, which is disposed adjacent to the skin layer and comprises an elastomer having an oxygen permeation coefficient at 23° C. under a relative humidity of 60% of 5,000 ml·mm/m²·day·MPa or smaller.

2. A pneumatic tire according to claim 1, wherein the compound having active hydrogen atoms is a compound having an odd number of atoms connecting the active hydrogen atoms, and the organic polyisocyanate compound is a compound having an odd number of atoms connecting isocyanate groups.

3. A pneumatic tire according to claim 1, wherein the compound having active hydrogen atoms is at least one compound selected from addition products of alkylene oxides to aromatic-aliphatic polyamines.

4. A pneumatic tire according to claim 3, wherein the compound having active hydrogen atoms is an addition product of an alkylene oxide to xylylenediamine.

5. A pneumatic tire according to claim 4, wherein the alkylene oxide is at least one compound selected from alkylene oxides having 2 to 4 carbon atoms.

6. A pneumatic tire according to claim 3, wherein the alkylene oxide is at least one compound selected from alkylene oxides having 2 to 4 carbon atoms.

7. A pneumatic tire according to claim 1, wherein the organic polyisocyanate compound is a reaction product of component (a) and component (b) or a reaction product of component (a), component (b) and component (c) and has at least two NCO groups at ends of a molecule, component (a), component (b) and component (c) being:

(a) a polyfunctional isocyanate compound, (b) at least one polyhydric alcohol selected from polyhydric alcohols having 2 to 10 carbon atoms, and (c) at least one compound selected from aromatic polyfunctional amines, aromatic-aliphatic polyfunctional amines, alicyclic polyfunctional amines, aliphatic polyfunctional amines, aliphatic alkanolamines, aromatic polybasic carboxylic acids, alicyclic polybasic carboxylic acids and aliphatic polybasic carboxylic acids.

8. A pneumatic tire according to claim 7, wherein the polyfunctional isocyanate compound of component (a) is at least one compound selected from xylylene diisocyanate and compounds derived from xylylene diisocyanate.

9. A pneumatic tire according to claim 8, wherein the polyfunctional isocyanate compound of component (a) is xylylene diisocyanate.

10. A pneumatic tire according to claim 1, wherein the skin layer has a thickness in a range of about 1 to 100 μm.

11. A pneumatic tire according to claim 10, wherein said range is 5 to 30 μm.

12. A pneumatic tire according to claim 1, wherein the auxiliary layer is disposed so that internal pressure in the tire is retained by the auxiliary layer when pin holes or cracks are formed in the skin layer.

* * * * *